(12) United States Patent
Tanaka et al.

(10) Patent No.: US 8,646,352 B2
(45) Date of Patent: Feb. 11, 2014

(54) WORM WHEEL

(75) Inventors: Yosuke Tanaka, Saitama (JP); Yasuo Shimizu, Saitama (JP); Atsuhiko Yoneda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 2 days.

(21) Appl. No.: 13/505,350

(22) PCT Filed: Oct. 20, 2010

(86) PCT No.: PCT/JP2010/006210
§ 371 (c)(1),
(2), (4) Date: May 1, 2012

(87) PCT Pub. No.: WO2011/058701
PCT Pub. Date: May 19, 2011

(65) Prior Publication Data
US 2012/0216645 A1 Aug. 30, 2012

(30) Foreign Application Priority Data
Nov. 11, 2009 (JP) ................................. 2009-257973

(51) Int. Cl.
*F16H 55/12* (2006.01)
(52) U.S. Cl.
USPC ............................................. 74/446; 74/449
(58) Field of Classification Search
USPC .................................. 74/434, 443, 446, 449
See application file for complete search history.

(56) References Cited

U.S. PATENT DOCUMENTS

| 1,212,608 A | * | 1/1917 | Calkins | 74/446 |
| 1,771,370 A | * | 7/1930 | Benge | 74/449 |
| 3,200,665 A | * | 8/1965 | Wells | 74/446 |
| 5,852,951 A | * | 12/1998 | Santi | 74/443 |
| 2009/0282939 A1 | | 11/2009 | Rogowski et al. | |

FOREIGN PATENT DOCUMENTS

| EP | 1 614 935 A1 | 1/2006 |
| JP | 55-123043 A | 9/1980 |
| JP | 4-069443 A | 3/1992 |
| JP | 11-301501 A | 11/1999 |
| JP | 2001-206230 A | 7/2001 |
| WO | 2008/000220 A2 | 1/2008 |

\* cited by examiner

*Primary Examiner* — Justin Krause
(74) *Attorney, Agent, or Firm* — Carrier Blackman & Associates, P.C.; William D. Blackman; Michael J. McCandlish

(57) ABSTRACT

Provided is a worm wheel that allows the residual stress in the plastic gear forming member thereof to be reduced, and suited for compact design. The worm wheel comprises a metallic core member (30) and a plastic gear forming member (20) formed on an outer periphery of the core member. In particular, the core member includes a boss portion (31) defining a pivot portion, an intermediate portion (32) extending radially from the outer periphery of the boss portion, and a cylindrical portion (33) connected to a radially outer end of the intermediate portion and having the gear forming member molded thereon coaxially with the boss, the cylindrical portion being formed with through holes (34) or cutouts (36) passed radially therethrough.

12 Claims, 7 Drawing Sheets

WORM WHEEL

TECHNICAL FIELD

The present invention relates to a worm wheel, and in particular to a worm wheel for an electric power steering device mounted on a vehicle.

BACKGROUND OF THE INVENTION

The electric power steering device (EPS) for a vehicle assists the steering effort of the vehicle operator. The steering torque applied to the steering wheel causes an input shaft to rotate, and is transmitted to an output shaft. The steering torque transmitted to the output shaft is detected by a torque detecting device, and the steering torque of the output shaft is assisted as required according to the detected steering torque. The output shaft is typically affixed with a worm wheel which forms a worm gear mechanism in cooperation with a worm connected to an electric motor and meshing with the worm wheel. The EPS activates the electric motor in dependence on the detected steering torque, and this driving torque is transmitted to the output shaft via the worm and the worm wheel to be added to the steering torque.

The worm wheel is typically formed as a composite structure including a metallic core member affixed to the output shaft and a plastic gear forming member attached to the peripheral part of the core member and provided with teeth that mesh with the worm. The metallic core member ensures the worm wheel to be securely attached to the output shaft, and the plastic gear forming member reduces the noises and vibrations caused by the meshing of the gear teeth with the worm. See Patent Document 1.

PRIOR ART DOCUMENT(S)

Patent Document(s)

Patent Document 1: JP 11-301501A

BRIEF SUMMARY OF THE INVENTION

Task to be Accomplished by the Invention

Such a worm wheel is made by using the cylindrical core member as an insert and injection molding plastic material around the periphery of the cylindrical core member. The plastic material is initially fluid but solidifies during the molding process, and a certain shrinkage occurs to the plastic material. This shrinkage causes the plastic material to grip the outer periphery of the cylindrical core member, and owing to the blocking of the shrinking deformation of the plastic material by the core member, some residual stress is produced in the gear forming member during the molding process thereof. This residual stress is known to decrease the tolerable stress level that may be produced in the plastic gear forming member.

This problem may be alleviated by using a multi-thread (double- or triple-thread) worm gear mechanism, but it requires the size of the worm wheel to be increased so that the space efficiency is impaired.

The present invention was made in view of such a problem of the prior art, and has a primary object to provide a worm wheel that allows the residual stress in the plastic gear forming member thereof to be reduced, and suited for compact design.

Means to Accomplish the Task

The present invention is directed to a worm wheel, comprising a metallic core member (30) including a pivot portion (37), and a gear forming member (20) made of plastic material and formed on an outer periphery of the core member. In particular, the core member includes a boss portion (31) defining the pivot portion, an intermediate portion (32) extending radially from the outer periphery of the boss portion, and a cylindrical portion (33) connected to a radially outer end of the intermediate portion and having the gear forming member molded thereon coaxially with the boss, the cylindrical portion being formed with through holes (34, 36) passed radially therethrough. The radial through holes may extend through the cylindrical portion, or alternatively may consist of blind holes (having a closed end) or cutouts made in an axial edge of the outer wall of the cylindrical portion. Throughout the present specification and claims, the terms "hollow portion" and "through hole" may be used interchangeable in order to emphasize the general nature of those terms as meaning a void or hollow area in the cylindrical portion.

According to this arrangement, because the cylindrical portion the retains the plastic material is formed with radial through holes, the shrinking of the plastic material in the corresponding positions are not blocked so that the residual stress is reduced and the reduction in the mechanical strength of the worm wheel can be avoided.

In this arrangement, the gear forming member may be formed by insert molding the plastic material with the cylindrical portion. Because the cylindrical portion of the core member is inserted in the plastic material, and is therefore wrapped in the plastic material, the strength of attachment between the core member and the gear forming member can be improved.

In such an arrangement, the through holes (34, 36) may be formed at positions circumferentially coinciding with (corresponding with) teeth (21) formed on an outer periphery of the gear forming member (20). By this matching the positions of the teeth with the through holes, the teeth which are subjected to a relatively high stress are prevented from being reduced in mechanical strength.

In such an arrangement, the gear forming member (20) may be formed by a plurality of layers (22, 23) of plastic material. By thus over-molding the worm wheel which is already molded with plastic material, the unevenness in the residual stress that may be produced during the molding process can be reduced, and the precision in the profile of the teeth can be improved.

The present invention may be implemented in such a manner that the boss position (31) receives an output shaft (2) of an automotive electric power steering device so that the core member (30) is fixedly secured to the output shaft (2). Thereby, the worm gear mechanism consisting of the worm wheel and the worm can be constructed as a highly compact unit, and the space efficiency of the electric power steering device can be improved.

Effect of the Invention

According to the present invention, the residual stress in the plastic gear forming member can be reduced, and the strength of the attachment between the core member and the gear forming member can be increased so the worm wheel can be formed as a highly compact component.

DETAILED DESCRIPTION OF THE PREFERRED EMBODIMENT(S)

<First Embodiment>

A first embodiment of the present invention as applied to an EPS is described in the following with reference to the drawings as required.

Figure 1:
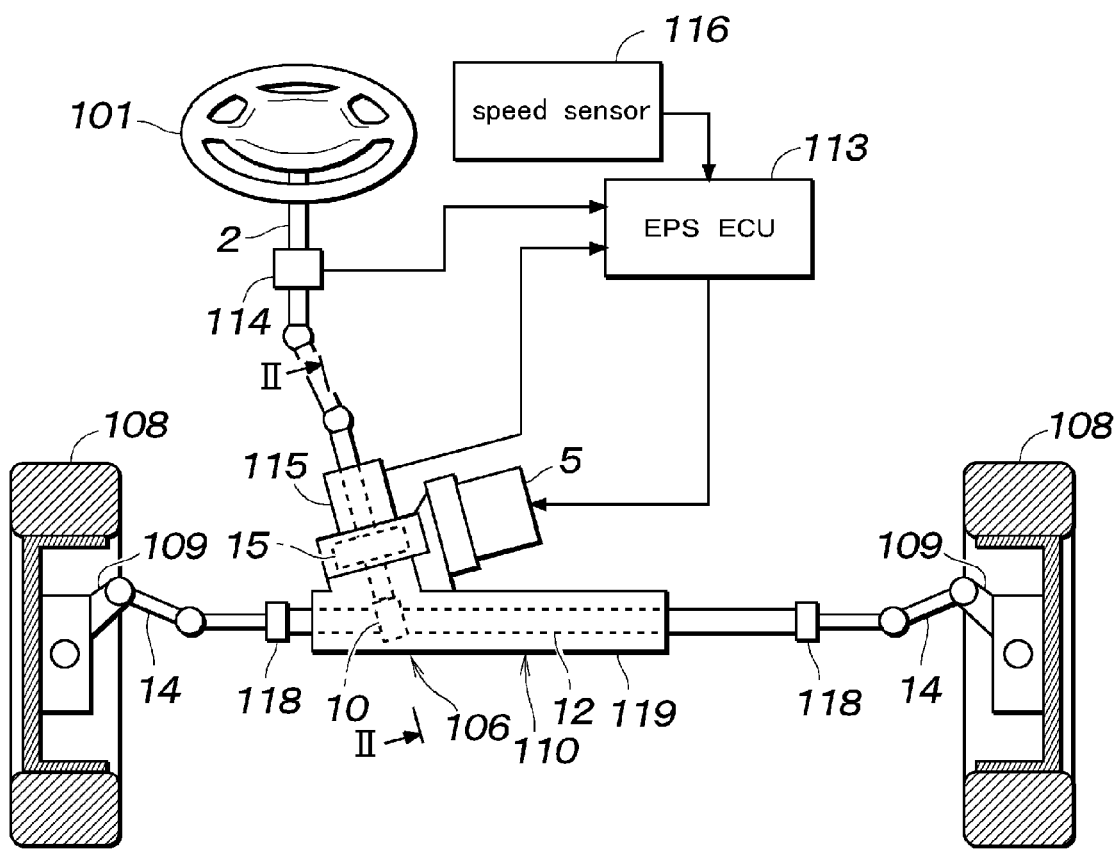
FIG. 1 is a schematic overall view of an electric power steering device to which the present invention is applied.

FIG. 1 is an overall view of an electric power steering device to which the present invention is applied. This electric power steering device is provided with an electric motor 5 for generating an assisting steering force that reduces the manual steering effort applied to a steering wheel 101.

Figure 3:
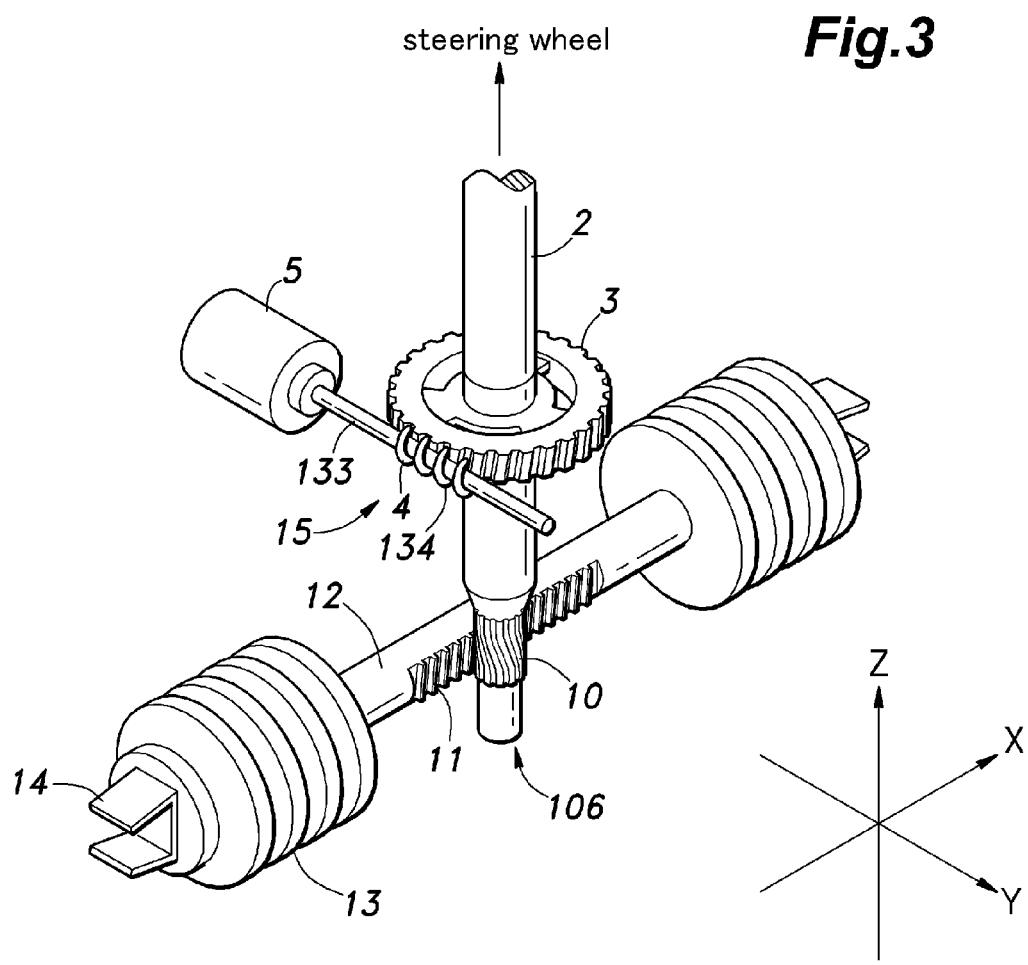
FIG. 3 is a fragmentary perspective view showing an external view of an essential part of the EPS embodying the present invention.

Referring to FIG. 3 also, this electric power steering device is further provided with a rack and pinion mechanism 106 including a pinion 10 integrally connected to the steering wheel 101 via a steering shaft 2 in a rotationally fast manner and a rack shaft 12 formed with a rack 11 meshing with the pinion 10 and disposed so as to be laterally moveable with respect to the vehicle body. Each end of the rack shaft 12 is provided with a joint 118 protected by a cover 13, and is connected to a knuckle arm 109 of a corresponding front wheel (steerable wheel) 108 via the joint 118 and a tie rod 14 so that the two front wheels 108 are steered in response to the angular movement of the steering wheel 101. The drive force of the electric motor 5 is transmitted to the steering shaft 2 via a worm gear mechanism 15 received in a gear box 110 along with the pinion 10.

The electric motor 5 is controlled by a steering control unit (EPS-ECU) 113 such that the required assisting steering force may be produced by the electric motor 5 according to the output signals received by the steering control unit 113 from a steering angle sensor 114 for detecting the steering angle of the steering wheel 101, a steering torque sensor 115 for detecting the manual steering torque applied to the pinion 10 and a vehicle speed sensor 116 for detecting the vehicle speed.

Figure 2:
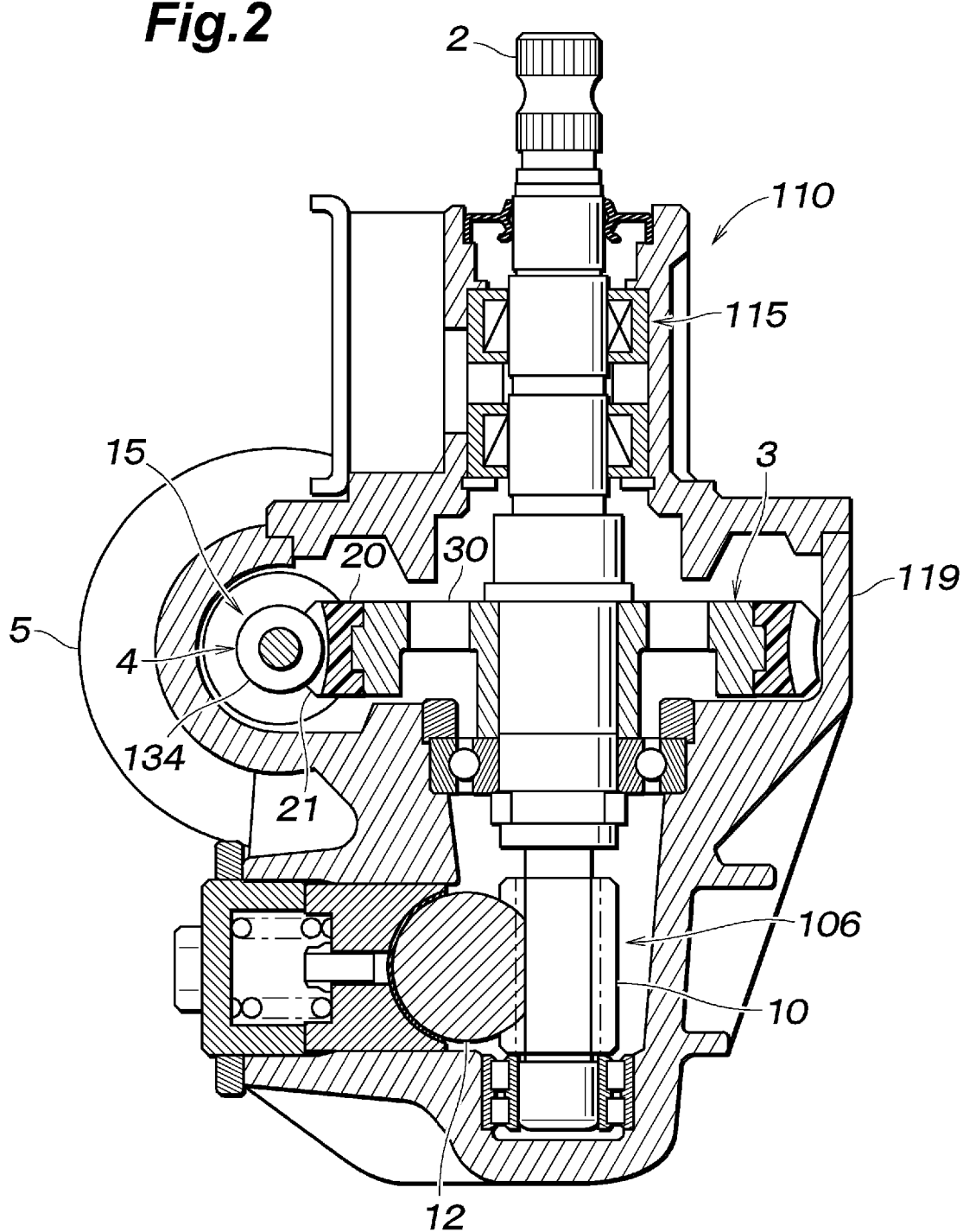
FIG. 2 is a sectional view of the gear box shown in FIG. 1 taken along line II-II.

FIG. 2 is a sectional view of the gear box 110 taken along line II-II of FIG. 1. The gear box 110 receives therein the worm gear mechanism 15 for transmitting the drive force of the electric motor 5 to the steering shaft 2 at a reduced speed, the rack and pinion mechanism 106 for converting the rotational movement of the steering shaft 2 into the linear movement of the rack shaft 12 and the steering torque sensor 115 for detecting the steering torque acting on the steering shaft 2.

The worm gear mechanism 15 comprises a worm 4 coaxially connected to the output shaft of the electric motor 5 and a worm wheel 3 fixed fitted coaxially on the steering shaft 2 so that the drive force of the electric motor 5 is transmitted to the worm 4 (drive gear) and the worm wheel 3 (driven gear) is caused to rotate in a corresponding manner.

Referring to FIG. 3, the worm 4 comprises a core member 133 consisting of a metallic member such as carbon steel around which a single thread (or tooth) 134 is formed. By using the single thread 134, a relatively large gear ratio can be achieved so that a relatively large torque can be obtained from the electric motor 5 having a relatively small output torque.

Referring to FIG. 1, when the steering wheel 101 is turned by a large angle, one of the joints 118 at the corresponding end of the rack shaft 12 abuts the housing 119, and this prevents any further movement of the rack shaft 12. When the rotation of the electric motor 5 is brought to a sudden stop, a large impact torque is applied to the worm gear mechanism 15. The rotational kinetic energy of the electric motor 5 immediately before coming to the stop is converted into the torsional elastic energy which is determined by the torsional stiffness of the worm 4 around the central axial line thereof. Because a gear forming member 20 of the worm wheel 3 is made of plastic material as will be discussed hereinafter, the rotational stiffness of the steering system is dictated by the stiffness of the teeth 21 of the worm wheel 3.

Figure 4:
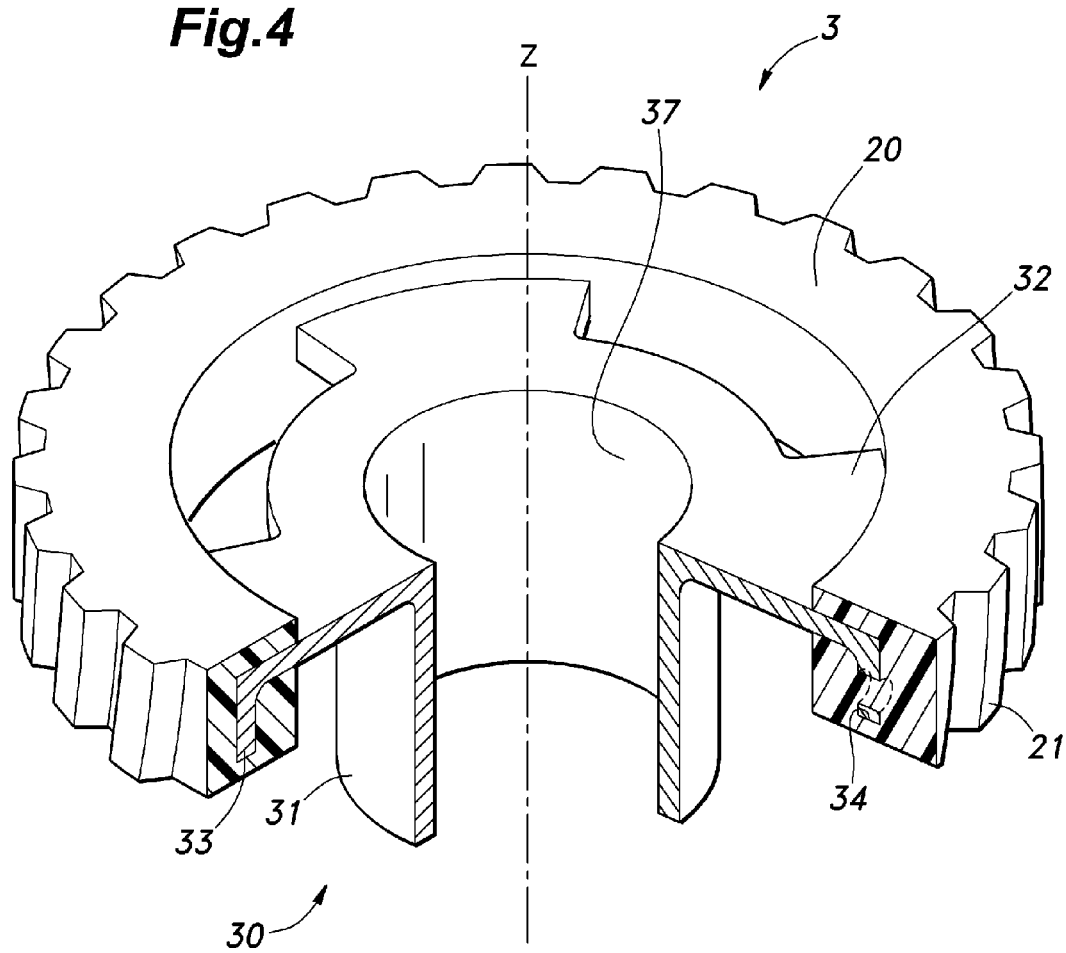
FIG. 4 is an overall perspective view of a worm wheel embodying the present invention partly in section.

The worm wheel 3 is described in the following with reference to FIGS. 4 and 5. The directions in the following description will be based on the directions X, Y and Z show in FIG. 3. Referring to FIG. 4, the worm wheel 3 consists of a metallic core member 30 and a plastic gear forming member 20 formed around the outer periphery of the core member 30. The core member 30 may be made of steel, for instance, while the gear forming member 20 may be made of polyamide resin, and formed by injection molding.

Figure 5:
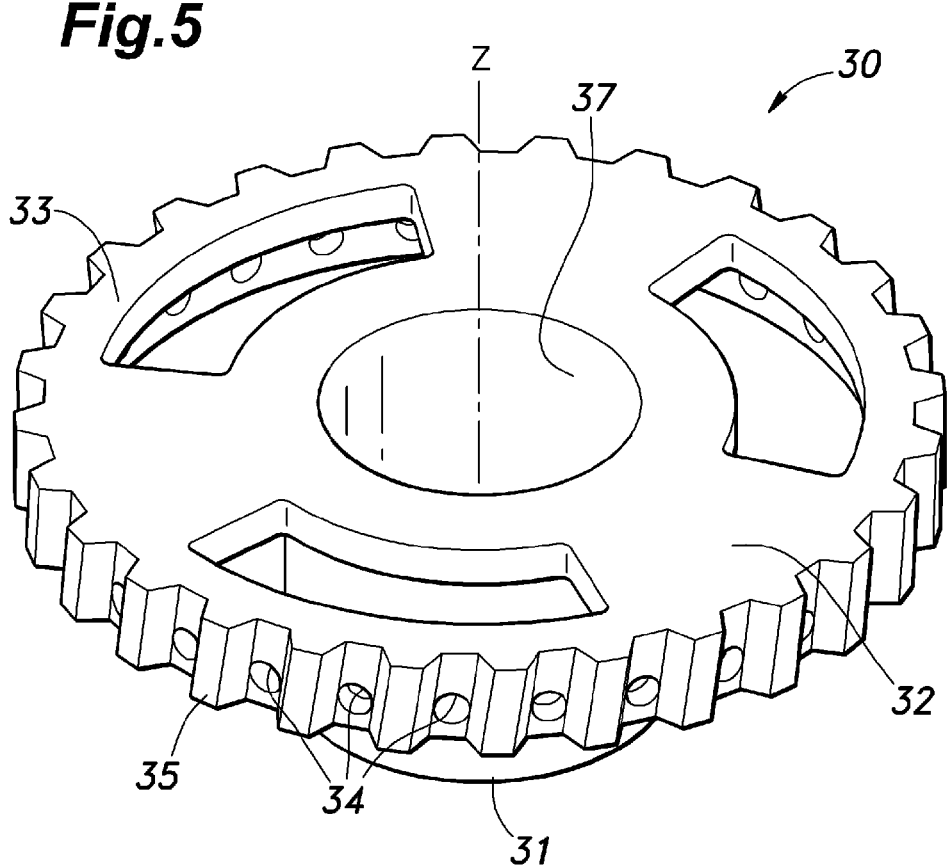
FIG. 5 is an overall perspective view of a core member of the worm wheel.

Referring to FIG. 5, the core member 30 consists of a cylindrical boss portion 31, an intermediate portion 32 extending radially outward from the outer peripheral surface of the boss portion 31 in the form of a plurality of spokes and a cylindrical portion 33 connected to the outer peripheral surface of the intermediate portion 32 and having a common central axial line (Z axis) as the boss portion 31. The outer peripheral wall of the cylindrical portion 33 is provided with a serrated outer peripheral surface, and radial through holes 34 in such a manner that the through holes 34 alternate with the projections 35 of the serration on the outer peripheral surface at a regular angular interval.

The output shaft 2 of the vehicle electric power steering device is fitted into a central bore 37 of the cylindrical boss portion 31 so that the core member 30 is fixedly attached to the output shaft 2 (Refer to FIG. 3, as well). The core member 30 is provided with the central bore 37 serving as a pivot portion in the illustrated embodiment, but may also be provided with an integral solid center shaft. The intermediate portion 32 joins the boss portion 31 and the cylindrical portion 33 to each other, and may have a number of spokes, an axial thickness and a circumferential width that suit the required mechanical strength of the worm wheel 3. The intermediate portion 32 may also be made of a solid disk, for instance. The cylindrical portion 33 is given with a greater axial (Z axis) dimension than the intermediate portion 32. As shown in the left hand side of the sectional view of FIG. 4, the plastic material is insert molded such that the plastic material is wrapped around the entirely cylindrical portion 33 and the outer peripheral part of the intermediate portion 32. Thereby, the radial movement of the plastic material is prevented, and a favorable attachment between the core member 30 and the gear forming member 20 can be achieved.

The through holes 34 are formed in the same phase relationship (in the circumferentially corresponding positions) as the teeth 21 of the gear forming member 20 as shown in the right hand side of the sectional view of FIG. 4. As the initially fluid plastic material solidifies, some shrinkage occurs, and the gear forming member 20 tends to shrink in the radial direction of the worm wheel 3. The through holes 34 accommodates this shrinkage, and reduces the residual stress that may be produced in the parts of the gear forming member 20 corresponding to the circumferential positions of the through holes 34. In particular, because the through holes 34 are located circumferentially so as to correspond to the teeth 21, the teeth 21 which are required to have a high mechanical strength are prevented from being reduced in mechanical strength. By ensuring a high mechanical strength in this manner, the width of the cylindrical portion 33 which is to be inserted in the plastic material can be made narrower than that of the prior art, and the compact and light weight design of the worm wheel is enabled with the added advantage of the reducing in the residual stress. The reduction in the residual stress also contributes to the improvement in the precision of the profile of the teeth which are formed by molding.

The projections 35 in the serration project from the outer periphery of the cylindrical portion 33, and extend a certain distance in the axial (Z axis) direction, and not only prevent the circumferential relative movement between the plastic gear forming member 20 with respect to the cylindrical portion 33 (core member 30) but also increase the bonding strength between the core member 30 and the gear forming member 20 owing to an increased contact area between them.

Figure 6:
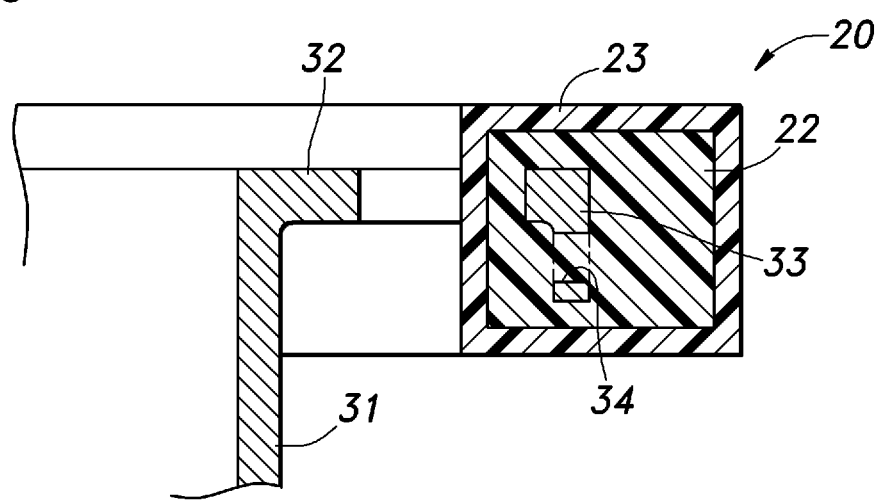
FIG. 6 is a fragmentary sectional view of a modified embodiment of the worm wheel.

A modified embodiment of the present invention is described in the following with reference to FIG. 6. Referring to FIG. 6, the gear forming member 20 is initially molded with a first plastic layer 22 and is further over-molded with a second plastic layer 23. According to this arrangement, the unevenness in the residual stress that may be produced as a result of the molding process can be mitigated, and the precision in the gear tooth profile may be improved. The thickness of the second plastic layer 23 may be selected such that no new residual stress may be produced.

<Second Embodiment>

A second embodiment of the worm wheel 40 according to the present invention is described in the following with reference to FIG. 7. The parts corresponding to those of the first embodiment (See FIGS. 1 to 3) are denoted with like numerals mostly without repeating the description of such parts, and only the parts of the second embodiment different from those of the first embodiment are described in any detail in the following.

Figure 7:
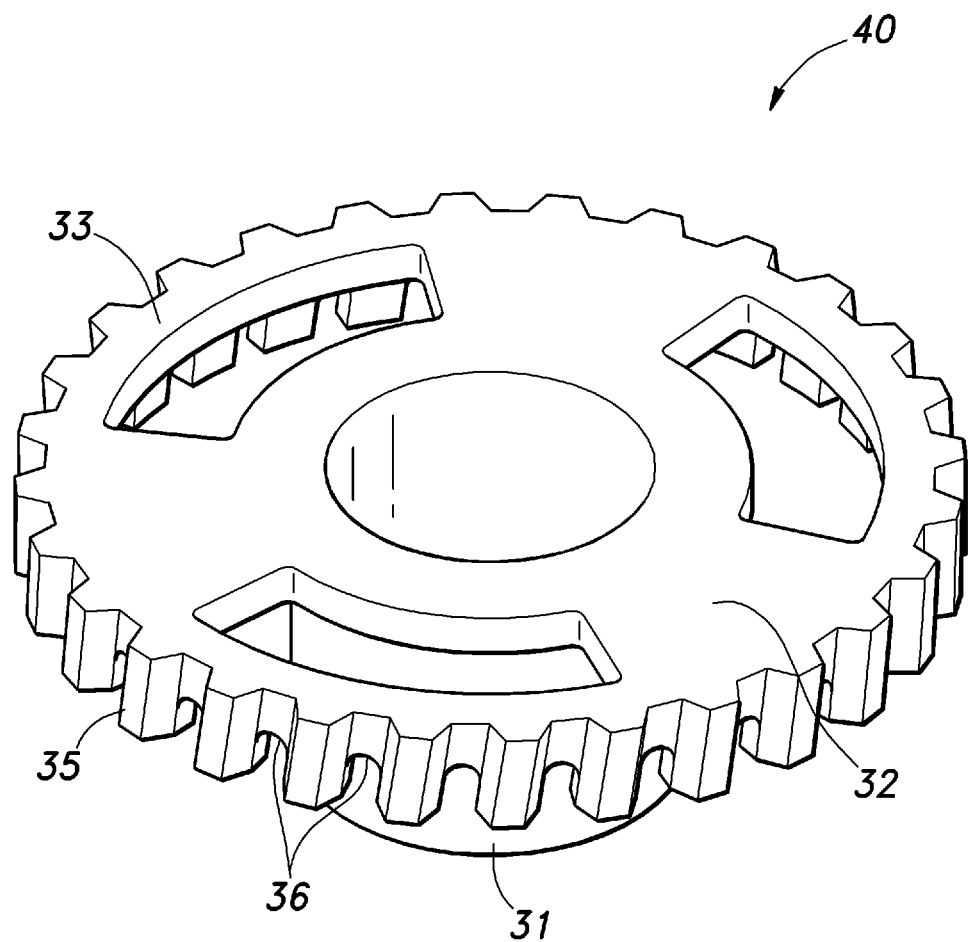
FIG. 7 is an overall perspective view of a core member of a second embodiment of the present invention.

Referring to FIG. 7, cutouts 36 are made across the lower edge of the outer peripheral wall of the cylindrical portion 33 at the positions corresponding to those of the through holes 34 in the first embodiment. Similarly as the though holes 34 of the first embodiment, these cutouts 36 accommodate the shrinking of the plastic material in the radial direction, and reduce the residual stress in the parts of the gear forming member 20 corresponding to the circumferential positions of the cutouts 36. By thus providing the cutouts 36 in the circumferential positions corresponding to the teeth 21, the teeth that are required to have a high mechanical strength are prevented from being reduced in mechanical strength.

Although the present invention has been described in terms of preferred embodiments thereof, it is obvious to a person skilled in the art that various alterations and modifications are possible without departing from the scope of the present invention which is set forth in the appended claims.

GLOSSARY

1 EPS (electric power steering device)
2 output shaft
3 worm wheel
4 worm
5 electric motor
10 pinion
11 rack
12 rack shaft
13 cover
14 tie rod
15 worm gear
20 gear forming member
21 tooth
22 first plastic layer
23 second plastic layer
30, 40 core member
31 boss portion
32 intermediate portion
33 cylindrical portion
34 through hole
36 cutout

The invention claimed is:

1. A worm wheel, comprising:
a metallic core member including a pivot portion; and
a gear forming member made of plastic material and formed on an outer periphery of the core member; wherein:
the core member includes a boss portion defining the pivot portion, an intermediate portion extending radially from the outer periphery of the boss portion, and a cylindrical portion connected to a radially outer end of the intermediate portion and having the gear forming member molded thereon coaxially with the boss portion;
the cylindrical portion is formed with a plurality of radially outward projections on an outer periphery thereof such that the projections are arranged circumferentially at a regular interval;
the cylindrical portion is formed with a plurality of hollow portions passed radially therethrough such that a hollow portion is located between each adjacent pair of projections; and
teeth formed on an outer periphery of the gear forming member are disposed at positions circumferentially coinciding with the hollow portions formed in the cylindrical portion.

2. The worm wheel according to claim 1, wherein the gear forming member is formed by insert molding the plastic material with the cylindrical portion.

3. The worm wheel according to claim 1, wherein the gear forming member is formed by a plurality of layers of plastic material.

4. The worm wheel according to claim 1, wherein the boss portion receives an output shaft of an automotive electric power steering device so that the core member is fixedly secured to the output shaft.

5. The worm wheel according to claim 1, wherein each of the hollow portions comprises a through hole extending through an outer peripheral wall of the cylindrical portion.

6. The worm wheel according to claim 5, wherein the gear forming member is formed by insert molding the plastic material with the cylindrical portion.

7. The worm wheel according to claim 5, wherein the gear forming member is formed by a plurality of layers of plastic material.

8. The worm wheel according to claim 5, wherein the boss portion receives an output shaft of an automotive electric power steering device so that the core member is fixedly secured to the output shaft.

9. A worm wheel, comprising:
a metallic core member including a pivot portion; and
a gear forming member made of plastic material and formed on an outer periphery of the core member; wherein:

the core member includes a boss portion defining the pivot portion, an intermediate portion extending radially from the outer periphery of the boss portion, and a cylindrical portion connected to a radially outer end of the intermediate portion and having the gear forming member molded thereon coaxially with the boss portion;

the cylindrical portion includes an outer peripheral wall, said outer peripheral wall formed with a plurality of radially outward projections such that the projections are arranged circumferentially at a regular interval;

the outer peripheral wall of the cylindrical portion is further formed with a plurality of cutouts passing radially therethrough and arranged such that a cutout is located between each adjacent pair of projections, and said cutouts open towards a lower edge of the outer peripheral wall; and teeth formed on an outer periphery of the gear forming member are disposed at positions circumferentially coinciding with the cutouts formed in the outer peripheral wall of the cylindrical portion.

10. The worm wheel according to claim 9, wherein the gear forming member is formed by insert molding the plastic material with the cylindrical portion.

11. The worm wheel according to claim 9, wherein the gear forming member is formed by a plurality of layers of plastic material.

12. The worm wheel according to claim 9, wherein the boss portion receives an output shaft of an automotive electric power steering device so that the core member is fixedly secured to the output shaft.

* * * * *